July 19, 1938.　　A. J. SCHOLTES　　2,124,474
QUICK INTERLOCKING DUPLICATE END HOSE COUPLING
Filed July 20, 1937　　2 Sheets-Sheet 1

Inventor
Albert J. Scholtes,
By Mawhinney & Mawhinney,
Attorneys

July 19, 1938.  A. J. SCHOLTES  2,124,474

QUICK INTERLOCKING DUPLICATE END HOSE COUPLING

Filed July 20, 1937  2 Sheets-Sheet 2

Inventor
Albert J. Scholtes,
By Mawhinney & Mawhinney,
Attorneys

Patented July 19, 1938

2,124,474

UNITED STATES PATENT OFFICE 2,124,474

QUICK INTERLOCKING DUPLICATE END HOSE COUPLING

Albert J. Scholtes, Baltimore, Md.

Application July 20, 1937, Serial No. 154,635

2 Claims. (Cl. 285—67)

The present invention relates to hose couplings and has for an object to provide a coupling the opposed members of which are duplicates, or of like and identical construction so that any two ends of hose, without predetermined selection, may be easily, quickly and securely coupled together in sealed relation.

The purpose of this invention is to do away with the usual male and female coupling members which not only require the definite selection of hose ends having the opposed coupling members, but which also require the separate manufacturing and handling of the different complemental coupling members and the consequent increased cost in the manufacture thereof.

Another object of the invention is to provide a hose coupling having like parts which are coupled together by two different directional movements of the parts relatively to each other and which must take place simultaneously to effect the coupling together of the parts, the movements working against each other upon any tendency of the parts, relatively, toward one of the movements, so that the hose ends are securely held coupled together during the twisting, turning, coiling, pulling and other movements of the hose during handling and use.

A further object of the invention is to provide duplicate hose coupling members which, when coupled together, lie in coaxial alinement with each other and with the attached hose ends; which have contacting faces lying in diagonal planes relatively to the axes of the coupling members, and which have interlocking portions for interengagement upon the positioning of one part in a predetermined axially angular position and in face to face contact with the other part and with its axis at an angle to the axis of said other part, so that the interlocking takes place not only by the turning of the first part on the other part but also by the simultaneous swinging of the first part into axial alinement with the other part.

A further object of the invention is to provide a coupling having all of these characteristics and which is adaptable to all types and constructions of flexible hose for all kinds of fluid, wherein axial pressure, of water or other fluid, maintains the interlock, by pressure sealing, between the parts, and wherein the parts cannot accidentally become unlocked or separated.

A still further object of the invention is to provide a hose coupling all parts of which are identical and which may be economically produced, and easily applied to hose ends without the exercise of any special skill or tools.

The invention also provides a novel construction of washer for insuring the sealing of the parts when coupled together and which increases the sealing engagement between the parts under pressure of fluid in the hose, and novel means for retaining the washer in the coupling member when uncoupled.

With the foregoing and other objects in view, the invention will be more fully described hereinafter, and will be more particularly pointed out in the claims appended hereto.

In the drawings, wherein like symbols refer to like or corresponding parts throughout the several views—

Figure 1:
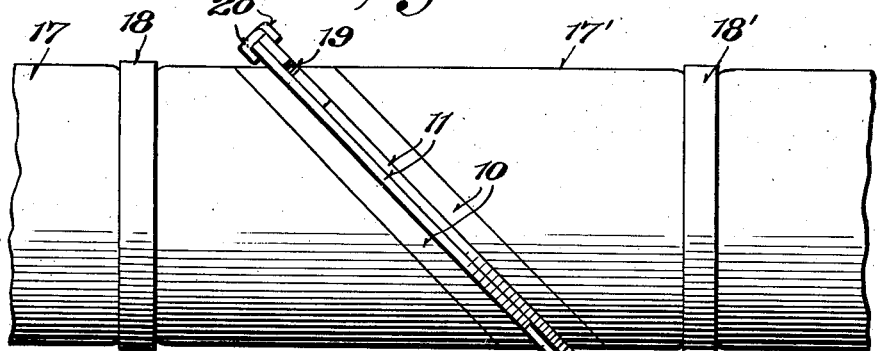
Figure 1 is a side elevation of a hose coupling constructed according to this invention and applied to adjacent hose ends.

Referring now to the drawings, as the two members or parts of the coupling are identical but one member need be described and the reference characters of the opposed member are primed to better illustrate the relation of the two like members when coupled together.

Each coupling member comprises an annular body part 10 which is constructed diagonally relative to the axis of the body part 10. The outer side or face of the body 10 has an outstanding annular flange 11 which lies in a diagonal plane of the body and is circular with reference to the normal axis of the plane. The body 10 is hollow and opens through its front wall with the inner marginal edge of the flange 11 projecting inwardly to a slight degree to provide an annular rib or shoulder 12 behind which is seated a compressible washer 13.

Figure 2:
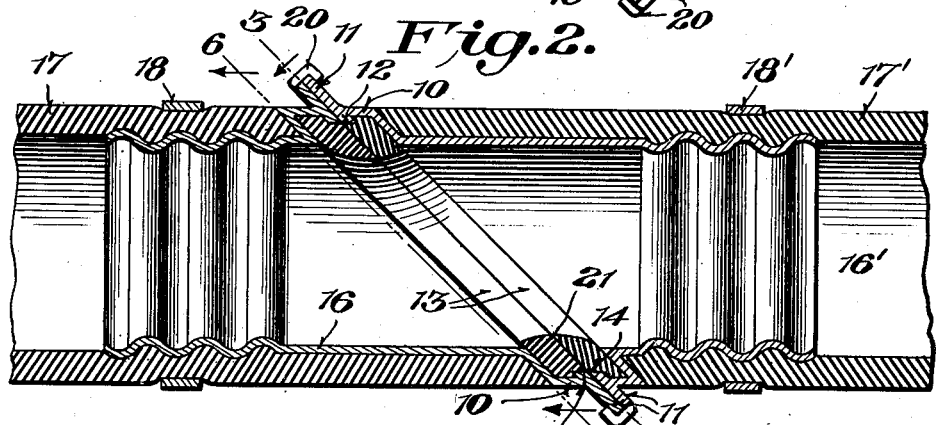
Figure 2 is a longitudinal section taken through the same.
Figure 7:
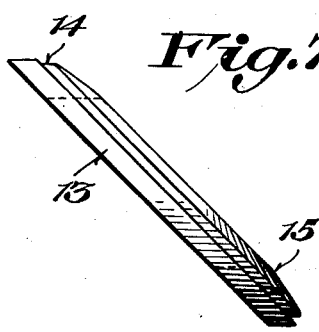
Figure 7 is a detail edge view of the packing ring or gasket used in each coupling member.

Referring now particularly to Figures 2 and 7, the washer 13 is also of diagonal construction so as to seat into the hollow body 10 and against the rear wall thereof. The washer 13 having an annular exterior groove or shoulder 14 adapted to engage behind the rib 12 so as to yieldingly hold the washer 13 in place. The washer 13 is provided at its outer or exposed side with a convex surface 15 which rises from the outer edge portion of the washer 13 to the inner edge portion thereof, and the width or radial thickness of the annular washer is slightly greater than the depth of the hollow body 10, as shown in Figure 2 so that the washer may be deformed and compressed under the pressure of fluid contained in the coupling. The hollow body 10 opens at its inner side to the interior of the coupling and also opens forwardly through the rib 12, the back wall of the body being relatively deep to support the washer 13 within the hollow body and also affording means for carrying a nipple 16 or any other suitable means for enabling the mounting of the coupling body 10 upon the extremity of the hose end 17.

The nipple 16 is coaxial with the hollow body 10 so that the nipple 16 is coaxial with the hose end 17 and the hollow coupling member or body is held diagonally against the extremity of the hose end. The hose end is preferably cut to the angle of the coupling body so that the latter may seat snugly thereagainst. The nipple 16 may be of any suitable construction and is shown as engaging within the end of the hose 17, and a clamping band 18 is suitably secured about the hose and in the region of the nipple 16 for binding the hose thereto as shown.

The flange 11 provides a face plate for the coupling member and is provided at opposed points with recesses or slots 19. The slots 19 may be located at any suitable point throughout the circular flange 11 to accomplish the purpose, and in the present instance are shown as being diametrically opposed. The flange or plate 11 is also provided with overturned tongues or lugs 20 which extend outwardly from the outer marginal edge portion of the flange 11 and are of a width to freely pass through the slots or recesses 19 in the flange 11, and the tongues or lugs are overturned against the outer side of the flange 11 a distance equal substantially to the thickness of the flange 11 for binding a second flange 11 against the first flange when the flanges are brought together and are turned relatively one to the other. The slots 19 and the tongues 20 thus provide an interlock which may be quickly and easily assembled and separated, the tongues 20 being interlocked by the relative circular movement of the adjacent flanges 11 of the coupling members about the central axis of the circular flanges 11.

Figure 3:
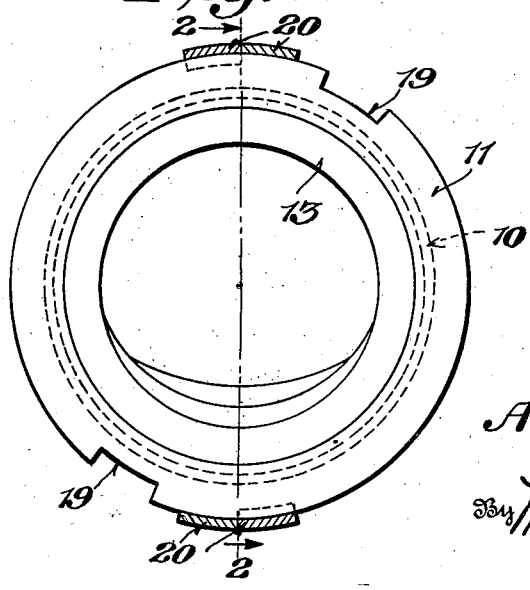
Figure 3 is a diagonal section taken on the line 3—3 of Figure 2, looking in the angular direction indicated by the arrows and showing a face view of one of the coupling members.
Figure 6:
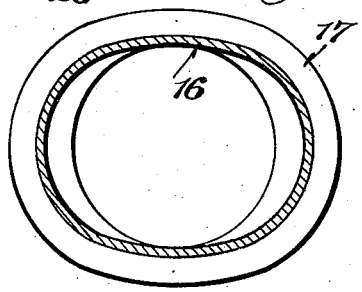
Figure 6 is a diagonal section taken on the line 6—6 of Figure 2, looking in the axial direction indicated by the arrows and showing the lateral bulging of the nipple of the coupling member to present a circular configuration to the diagonally disposed face of the coupling member.

As may be seen from a comparison of Figures 3 and 6 with reference to Figure 2, looking diagonally upon the coupling on the axis of the circular flange 11, the latter presents a true circular construction so that when a pair of the members are brought together with their washers 13 therein, the coupling and uncoupling movements are truly circular and there is no eccentric rubbing or wearing of the parts which tends to distort and disrupt the sealing of the washers or gaskets 13. In Figure 3 the lower wall of the nipple 16 is shown as extending backwardly and upwardly, illustrating the diagonal axis of the flange 11 with reference to the longitudinal axis of the nipple 16 and the hose end 17.

In Figure 6 the opposite sides of the nipple 16, adjacent the body 10, are necessarily bulged so as to expand and distort the hose end 17 sufficiently to impart a round circular shape to the hose end 17 in the diagonal plane of the flange 11. As Figure 6 is taken on the axial line of the nipple 16 the annular portion of the nipple 16 appears with a major transverse axis, whereas the receding upper portion of Figure 6 shows from Figure 2 that the transverse and vertical axes are identical so as to provide the circular formation of the hose end and the coupling body 10 in a diagonal plane.

Figure 5:
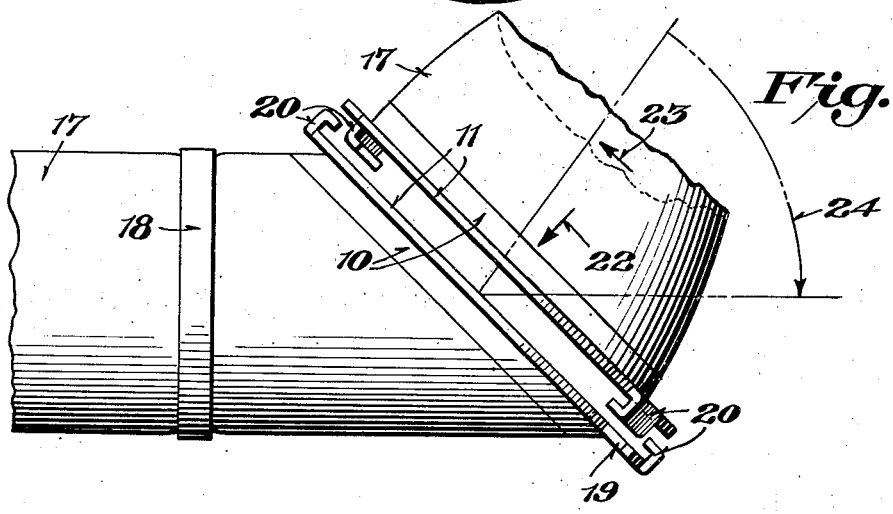
Figure 5 is a side elevation of the coupling with the members in alined positions ready for coupling; the arrows showing the directions of advancement of the members together, and of the turning and swinging of one member on the other member to effect the coupling together of the members.

In use, two coupling members of the construction of this invention are secured to the respective hose ends 17 and 17' by the clamping bands 18, or the like, which bind the hose ends upon the nipples 16 and 16'. With reference to Figure 5, the hose ends are about to be coupled together and it will be noted that one of the hose ends 17 may be held in a definite position while the other hose end 17' is turned and swung until the flanges 11 and 11' are in substantially parallel relation and with the tongues 20 of one flange opposite the recesses or slots 19 in the other flange. When in this position the hose end 17' extends with its axis at a fairly sharp angle with respect to the longitudinal axis of the hose end 17. The flange 11' is now advanced against the flange 11 in the direction shown by the arrow 22, and the tongues 20 pass through the slots 19, and the outer convex faces 15 of the washers 13 are brought into face contact with the inner edges of the washers first meeting and subsequently being compressed and deformed inwardly to provide an effective seal which is shown at 21 in Figure 2. The hose section 17' with its coupling member is now turned to rotate the flange 11' against the flange 11, Figure 5 showing the direction of rotation by the arrow 23. On account of the diagonal construction of the coupling member, the hose end 17' must not only be turned as shown by the arrow 23, but at the same time must be swung upon its central axis from a central point where the axis intersects the longitudinal axis of the hose end 17. This swinging movement of the hose end 17' is indicated by the broken line and arrow 24. Thus, as the two flanges 11 and 11' are interlocked by a relative rotary movement, the hose ends 17 and 17' are swung into coaxial or longitudinal alinement, and the parts cannot be uncoupled until the hose ends are relatively swung and simultaneously turned in an opposite manner to effect the rotation of the flanges 11 and 11' upon each other to free the tongues 20.

Figure 4:
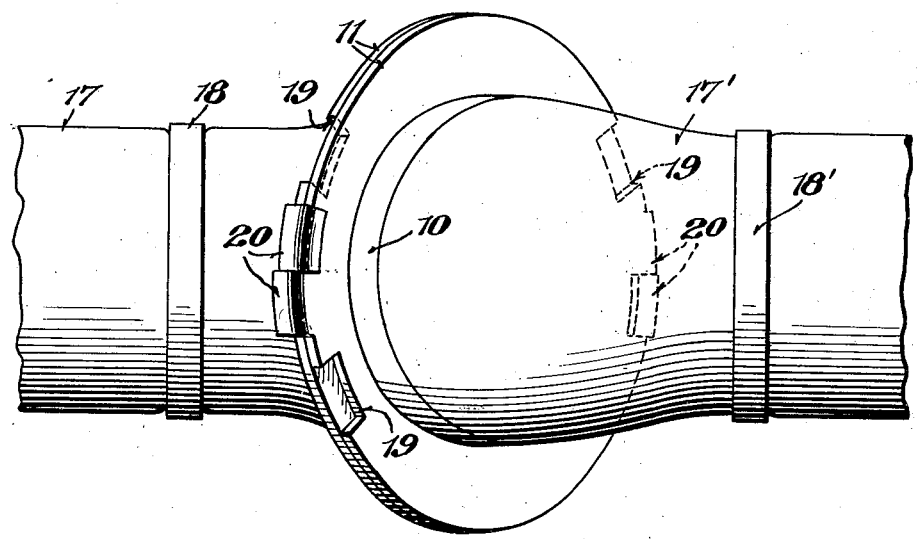
Figure 4 is a top plan view of the coupling as shown in Figure 1.

It will thus be understood that when the coupling is closed as shown in Figures 1, 2 and 4, any axial strain will be resisted by the tongues 20 so that the parts cannot be separated by pushing or pulling of the hose, and any twisting and turning of the hose will not affect the coupling unless there is a positive turning of the coupling members relatively in one direction accompanied by the simultaneous swinging into the required angle with respect to each other during the turning action. During the normal use and handling of the hose the turning and swinging actions are not simultaneously produced and consequently the coupling cannot be accidently opened.

The internal fluid presure acts radially upon the abutting washers 13 and 13' so as to increase the sealing pressure of the convex faces 15 against each other proportionately to the fluid pressure, such pressure compresing the washers into the opposed facing pockets of the body portions 10 and 10' to increase the locking and sealing effects of the coupling members. The diagonal flanges 11 on the coupling members provide contacting faces which are oblique to the axes of their respective coupling members, and the interlocking lugs 20 and the receiving slots 19 are so axially angularly disposed on and in the flanges 11 as to register for assembling and separation only when the members themselves are relatively swung out of coaxial alinement. As the contacting faces are pressed together and turned for interlocking the lugs 20 with the flanges 11, the members must be swung into coaxial alinement. The lugs 20 are thus held against release except upon the coordinating turning and swinging of the members relative to each other back into their initial angular and rotative positions.

The body portions of the coupling members provide ring seats which open through the outer ends of the coupling members and have the overhanging shoulders 12 for holding the washers 13 in the seats and the washers have their inner marginal edge portions thickened so as to project outwardly from the coupling members and provide an excess of compressible material forming the bulged bead 21 at the inner meeting edges of the washers and the convex faces 15 which insure the sealing of the coupling members together not only by their interlocking engagement but also by the pressure of fluid in the coupling.

It is obvious that various changes and modifications may be made in the details of construction and design of the above specifically described embodiment of this invention without departing from the spirit thereof, such changes and modifications being restricted only by the scope of the following claims.

What is claimed is:

1. A hose coupling, comprising a pair of like diagonal coupling members, and interlocking means carried by the diagonal coupling members operable for interlocking the coupling members together upon relative turning and swinging of the coupling members, said interlocking means comprising pairs of lugs and pairs of lug receiving slots on each of said coupling members.

2. A hose coupling, comprising a pair of like diagonal coupling members, and interlocking means carried by the diagonal coupling members operable for interlocking the coupling members together upon the relative turning and swinging of the coupling members, said interlocking means comprising pairs of diametrically opposed like lugs on each coupling member, said lugs adapted to abut and form stops when the coupling members are turned and swung into coaxial alinement.

ALBERT J. SCHOLTES.